United States Patent [19]
Beck et al.

[11] 3,762,428
[45] Oct. 2, 1973

[54] VOLUMETRIC GAS MIXING SYSTEM

[75] Inventors: William Donald Beck, Columbus; Juan Hamilton Crawford, Dublin, both of Ohio

[73] Assignee: Ocean Systems, Inc., New York, N.Y.

[22] Filed: Nov. 15, 1971

[21] Appl. No.: 198,744

[52] U.S. Cl............... 137/88, 137/101.19, 137/114
[51] Int. Cl. .......................................... G05d 11/02
[58] Field of Search ........... 137/7, 88, 100, 101.19, 137/114; 235/151.12, 151.34

[56] References Cited
UNITED STATES PATENTS

| | | | |
|---|---|---|---|
| 3,493,005 | 2/1970 | Kakegawa........................... | 137/100 |
| 3,515,155 | 6/1970 | Haffner et al........................... | 137/7 |
| 3,478,767 | 11/1969 | Kister.................................... | 137/88 |
| 1,452,265 | 4/1923 | Collins et al...................... | 137/88 X |
| 1,999,740 | 4/1935 | Schmidt et al................... | 137/100 X |
| 2,072,384 | 3/1937 | Schmidt............................ | 137/88 X |
| 3,558,045 | 1/1971 | Smith et al...................... | 235/151.12 |

FOREIGN PATENTS OR APPLICATIONS

27,114  11/1969  Japan................................... 137/88

*Primary Examiner*—William R. Cline
*Attorney*—W. R. Hulbert

[57] ABSTRACT

A system for mixing gases volumetrically by comparing relative flows between the constituent gases and the combined total gas flow. A signal is supplied to a regulator valve in line with the constituent gas flow conduit to vary the amount of flow therein until the correct proportion is established. The total gas flow is not maintained constant.

3 Claims, 2 Drawing Figures

F I G. I.

VOLUMETRIC GAS MIXING SYSTEM

This invention relates to a system for mixing gases from individual storage facilities or other suitable sources in predetermined proportions and for delivering the mixed gas at a relatively high pressure.

The system of the present invention comprises: a separate supply source for each of said plurality of gases; a mixing member for combining said gases; separate conduit means connecting each supply source to said mixing member; regulating means for maintaining substantially equal pressure in each of said conduit means; a gas discharge line connected to the output of said mixing member; comparator means for comparing the relative ratio of total gas flow in said discharge line and the gas flow in a first one of said conduit means, said comparator providing an output signal when the relative ratio of flow between said compared gases falls outside a predetermined range; a first adjustable flow regulator connected in line with said first one of said conduit means; a second adjustable flow regulator connected in line with a second one of said conduit means, said second flow regulator being manually adjustable for establishing an initial total gas flow in said discharge line; and means responsive to said comparator output signal for automatically adjusting said first flow regulator.

One advantage of the present invention is that all of the gases are mixed at substantially the same pressure and temperature, but that the actual value of pressure and temperature at any moment is not important within reasonable limits.

A further advantage of the invention is that the total flow is determined by the demand, up to the maximum flow for which the mixer is sized, without variation of the pre-set delivery pressure.

Another feature of the invention is that the pressure drop across the system can be made relatively small so that the delivery pressure can be close to the supply pressure. Delivering mixed gas at a high pressure permits a large mass of gas to be processed rapidly, enhancing the efficiency of the operation.

An object of the invention is to facilitate the volumetric mixing of two, three, or more gases in predetermined proportions.

Another object is to perform the mixing operation of gases at high pressure in the most efficient manner.

Another object is to deliver mixed gases at a constant pre-set pressure.

Other objects and advantages of the present invention will become apparent from the following detailed description and claims with reference to the accompanying drawings in which:

Figure 1:
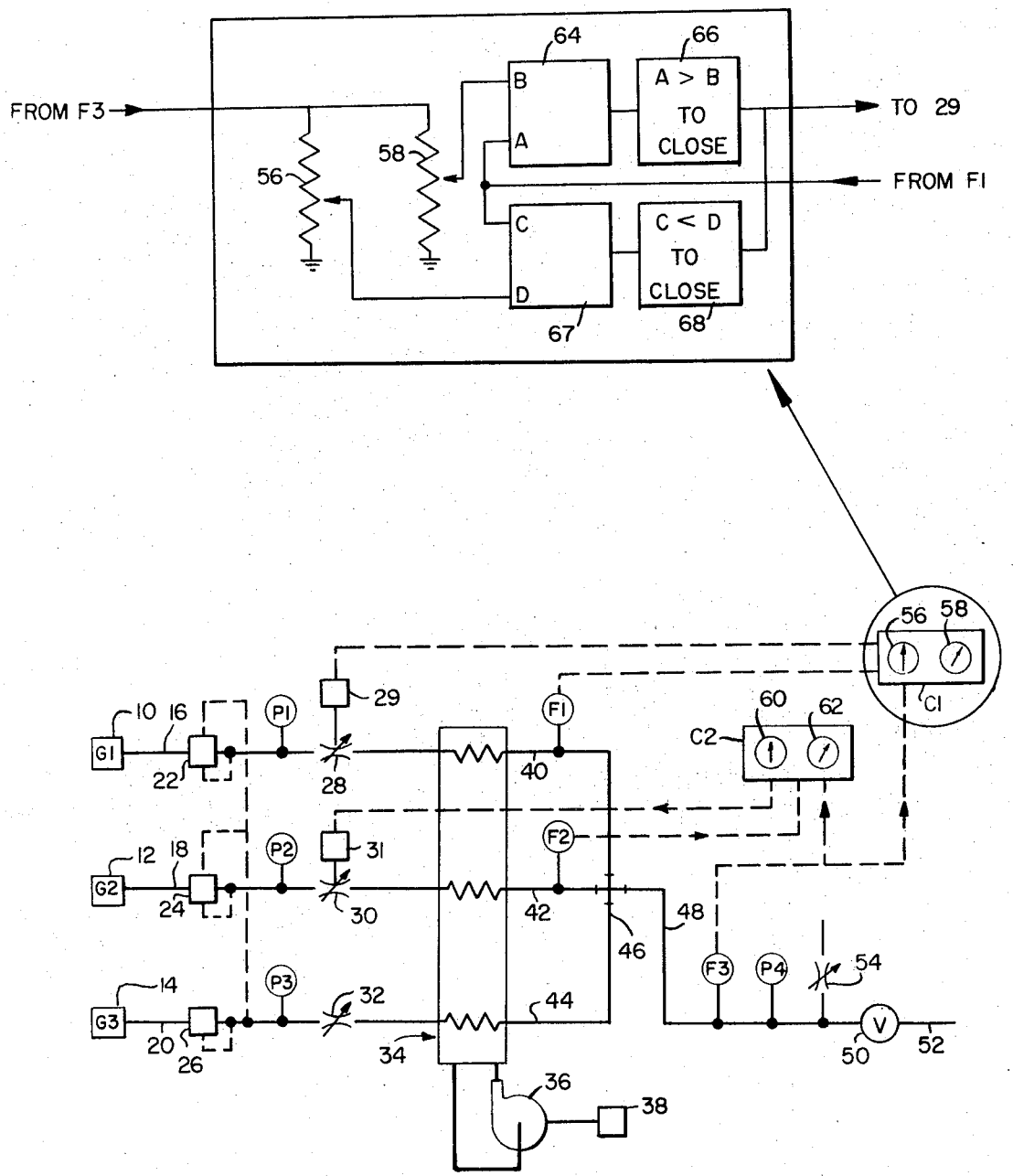
FIG. 1 is a schematic diagram of the system as adapted for mixing three supply gases with an expanded showing of one of the automatic control units.

The basic functional operation of the system is hereafter described with reference to FIG. 1. Gases are supplied from individual storage facilities 10, 12, 14, or other sources of supply, to gas supply lines 16, 18, and 20 at relatively high pressures. Each gas supply line contains a different gas or mixture of gases at a convenient pressure such as, for example, 2,000 pounds per square inch, but the pressure in the different lines need not be equal and may vary during operation of the system. Examples of gases or mixtures which may be used are helium, oxygen, air, nitrogen, carbon dioxide, hydrogen, anesthetics, anodynes, narcotics or other physiologically active gases, and combustibles.

The pressure in each of the supply lines 16, 18 and 20 respectively are reduced as the gases pass through pressure regulating valves 22, 24, and 26, and through flow regulating valves 28, 30, and 32. Pressure regulators 22, 24, and 26, are used to reduce the supply pressure of each gas to an approximate uniform working pressure, indicated on the pressure gauges P1, P2, and P3. Regulators 22 and 24 are loaded from supply line 20 to equalize the pressure in the respective lines. From the pressure regulators 22, 24, and 26 the gases flow through respective flow regulating valves 28, 30, and 32. Two of the flow regulating valves namely 28 and 30 are automatically operated by power actuators 29 and 31 respectively. One gas flows through a manually pre-set flow regulating valve 32; the purpose of which is to induce adequate flows through the other flow regulating valves 28 and 30. The manually pre-set regulating valve 32 controls the total flow in the system which varies in accordance with demand and with changes in gas flow through valves 28 and 30.

The temperature of the supply gases are not predetermined and as such, the gases may be at different temperatures as they leave the flow regulating valves 28, 30 and 32 respectively. To bring all three gases to the same temperature the gases in their unmixed state are passed separately through a conventional heat exchanger 34. Heat exchanger 34 is filled with a heat-exchanging medium such as water, polypropylene glycol, polyethylene glycol, or mixtures thereof. The heat-exchanging medium is kept in circulation by pump 36 driven by motor 38. Emerging from the heat exchanger 34, the gases are separately passed through gas conduits 40, 42 and 44 and immediately thereafter mixed together in junction member 46. The mixed gas is then discharged through gas conduit 48. The flow rate of each of the gases in gas conduits 40 and 42 are measured by in-line flow meters F1 and F2 respectively while the flow rate of the gas mixture is measured by flow meter F3. Pressure in the mixed gas conduit 48 is indicated by a pressure gauge P4. The mixed gas thereafter flows through a shut-off valve 50 to the exit delivery line 52. A bypass valve 54 is provided to permit a flow of gas through the system for calibration without the need of flowing gas through the delivery line 52.

Gas flow conduits 40, 42 and 48 linking respectively flow meters F1, F2 and F3 are sized large enough so that there is practically no pressure drop as the gases flow through them, and the pressure at each flow meter is the same as the pressure at the point where the gases mix. Therefore, the three gas flows are measured by the flow meters at the same pressure and at the same temperature even though the exact numerical value of that pressure and that temperature may not be known and need not be controlled precisely. The actual pressure is known approximately from the reading of pressure gauge P4, and the temperature may be determined if desired by means of a thermometer, thermocouple, or similar device. However, it is not necessary for the operation of the gas mixer to know what these values are.

Correct proportioning of the mixture is accomplished by adjusting power-operated flow regulating valves 28 and 30. Constituent gases are supplied to the flow regulating valves 28, 30 and 32 at approximately the same pressure, and the gases mix prior to passing through flow meter F3. Compared with the operating pressure, pressure drops across the heat exchanger 34 are small, and pressure drops across flow meters F1 and F2 are also small; at the mixing junction the three gases are at the same pressure. Therefore, pressure drops across flow regulating valves 28, 30 and 32 must be approximately equal and relative flows through the three flow regulating valves will depend on the relative degree of opening of power-operated flow regulating valves 28 and 30, flow regulating valve 32 being hand pre-set.

Flow meters F1, F2 and F3 are conventional meters which provide an output electrical signal proportional to the flow of gas therethrough. Such output signals are transmitted to electronic control units C1 and C2. Electronic control unit C1, which is equivalent in function to unit C2, is more elaborately shown in FIG. 1 for a clearer understanding of its operation. In control units C1 and C2 the signals are compared according to the settings of mixture proportioning control knobs 56, 58, 60 and 62 as explained hereinafter, and the results of the comparison are transmitted to the power units which operate flow regulating valves 28 and 30. These valves are accordingly obliged to open or close in the right amount to adjust the flow in the corresponding flow meter to the desired level.

In control unit C1 an electrical signal from flow meter F1, representing the flow of one of the constituent gases of the mixture, is electronically compared with the electrical signal from flow meter F3, representing the total flow of the mixed gases. Thus, for a given setting of the limit set point knobs 56 and 58 a fixd ratio of constituent gas volume flow in gas conduit 40 to total gas flow is established. If the ratio of the constituent gas volume flow to the total volume flow of the mixture is greater than the value preset on the upper limit set point knob 56, A will be greater than B and comparator 64 will cause an internal relay 66 to close. This situation sends a predetermined signal to flow to the regulating valve actuator 29, thus reducing the flow of the constituent gas through flow regulating valve 28. If the ratio of the constituent gas volume flow to the total volume flow of the mixture is less than the value preset on the upper limit set point knob 56, A will be less than B and internal relay 66 will open.

Conversely, if the ratio of the constituent gas volume flow to the total volume flow of the mixture is less than the value preset on the lower limit set point knob 58, C will be less than D and comparator 67 will cause internal relay 68 to close. This situation sends a predetermined signal to flow to the regulating valve actuator 29, thus increasing the flow of the constituent gas through flow regulating valve 28. If the ratio of the constituent gas volume flow to the volume flow of the mixture is greater than the value preset on the lower limit set point knob 58, C will be greater than D and internal relay 68 will open. Thus, regulating valve 28 is adjusted to maintain a flow condition between the limit set by knobs 56 and 58 of control unit C1. Control unit C2 operates similarly to control unit C1 in comparing the flow of a second constituent gas with the total flow of the mixed gases. The regulating valve 30 is adjusted to maintain a flow condition between the limits set by knobs 60 and 62 of control unit C2. It is to be understood that the total flow of mixed gas is not fixed and the actual flow need not be known to achieve the desired proportion between the constituent gas flow and the total gas flow.

Figure 2:
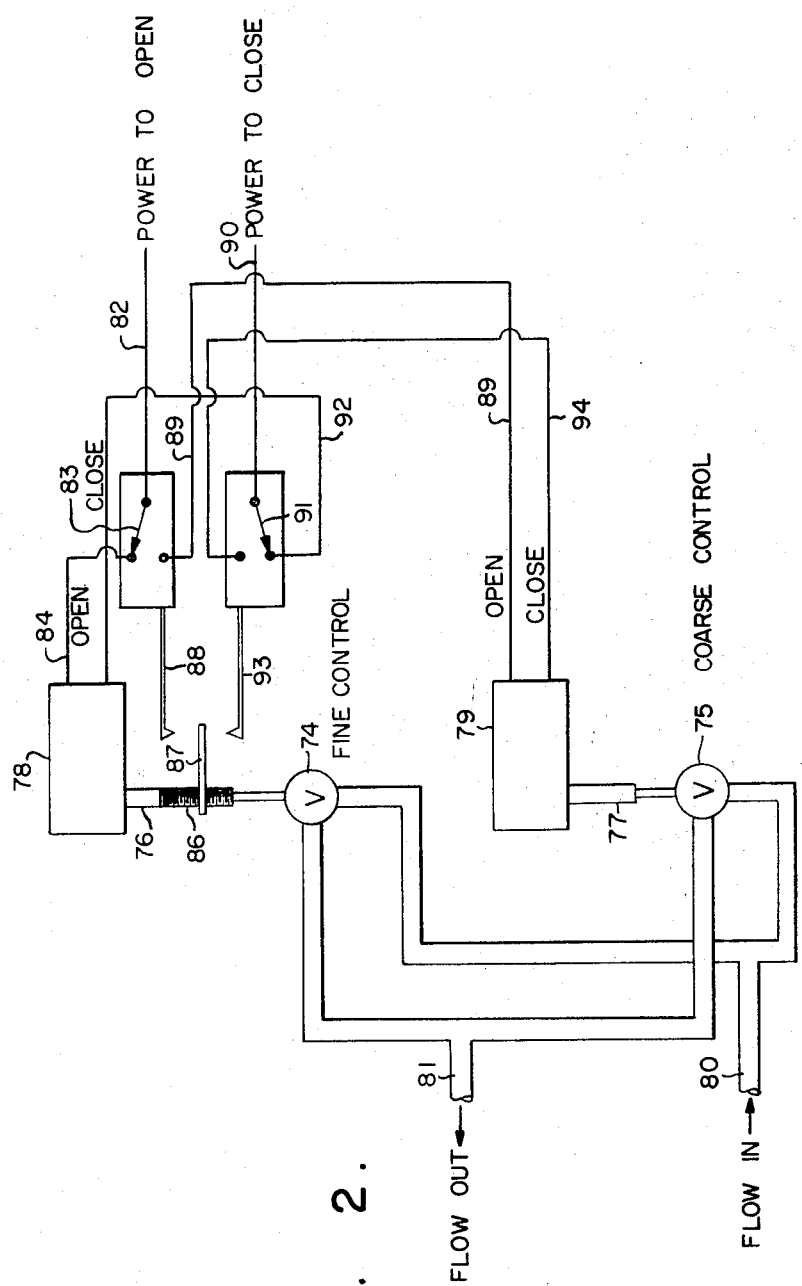
FIG. 2 is a diagram showing one of the flow regulating valves of FIG. 1 replaced by two flow regulating valves operating in parallel, for expanding the range and sensitivity of control.

FIG. 2 shows how power-operated flow regulating valves 28 and 30 may each be substituted by two or more power-operated flow regulating valves in parallel. The flow regulating valves and their associated power operators are regularly available commercial units.

74 and 75 are flow regulating valves, and may be of the type commonly known as "needle valves." Flow through the valves is increased or decreased by rotating valve stems 76 and 77, these valve stems being rotated by drive motors 78 and 79, respectively. The "flow in" and "flow out" indicated at 80 and 81 are the sums of the flows through both valves 74 and 75.

Flow regulating valve 74 is a fine control flow regulating valve, in which the change in flow with each rotation of stem 76 is small. Flow regulating valve 75 is a coarse conrol flow regulating valve, in which the change in flow with each rotation of stem 77 is relatively large, e.g. about 20 times as great as the change obtained with flow regulating valve 74.

When an increase in flow is required, power is applied to electrical connection 82, passes through switch 83, and reaches connection 84 on drive motor 78. On receiving power through connection 84, the drive motor 78 causes stem 76 to rotate, thus allowing the flow through flow regulating valve 74 to increase. A portion (86) of stem 76 is threaded, and carries on itself a rider 87 which moves along the stem as it is rotated, moving up or down according to the direction of rotation. As flow regulating valve 74 approaches its maximum opening, rider 87 contacts lever arm 88 and causes switch 83 to transfer the incoming electrical power from connection 84 to connection 89 on drive motor 79. Drive motor 79 thereupon causes stem 77 to rotate, allowing the flow through flow regulating valve 75 to increase.

If the power supply is interrupted, the two flow regulating valves will remain fixed at the last setting reached. If power is then reapplied to electrical connection 82, it will be transferred directly through switch 83 to connection 89 on drive motor 79. If the new application of power is made to connection 90, the electrical power will pass through switch 91 to connection 92 on drive motor 78, causing stem 76 to rotate in the opposite direction to which it did before, reducing the flow through flow regulating valve 74 and causing rider 87 to travel along threaded portion 86 in the opposite direction to which it traveled before. When flow regulating valve 74 approaches the fully closed condition, rider 87 will contact lever arm 93 and cause switch 91 to transfer the incoming electrical power to connection 94 on drive motor 79.

When small adjustments of flow are required, they are made by the fine control flow regulating valve 74. When the adjustment in flow is larger than can be accommodated by this flow regulating valve within its limited range, the electrical power is automatically transferred to coarse control flow regulating valve 75. In this manner of flow control, typical ranges and accuracies of constituent gases in the final mixture may be as follows (assume one gas (oxygen) is to be controlled):

a. 0.5 to 1.0% oxygen in final mixture accurate to ± 0.15%.

b. 1.0 to 25% oxygen in final mixture accurate to ± 0.25%.

c. 25 to 60% oxygen in final mixture acurate to ± 0.50%.

While the form of apparatus herein described constitutes a practical embodiment of the invention, it is to be understood that numerous changes may be made without departing from the general principles and scope of the invention.

What is claimed is:

1. A system for volumetrically mixing a plurality of gases in predetermined proportions at a relatively high working pressure comprising:
   a separate supply source for each of said plurality of gases;
   a mixing member for combining said gases;
   separate conduit means connecting each supply source to said mixing member;
   regulating means for maintaining substantially equal pressure in each of said conduit means;
   a gas discharge line connected to the output of said mixing member;
   comparator means for comparing the relative ratio of total gas flow in said discharge line and the gas flow in a first one of said conduit means, said comparator means providing an output signal when the relative ratio of flow between said compared gases falls outside a predetermined range;
   a first adjustable flow regulator connected in line with said first one of said conduit means;
   a second adjustable flow regulator connected in line with a second one of said conduit means, said second flow regulator being manually adjustable for establishing an initial total gas flow in said discharge line; and
   means responsive to said comparator means output signal for automatically adjusting said first flow regulator.

2. A system as defined in claim 1 further comprising:
   a third adjustable flow regulator connected in line with a third one of said conduit means;
   second comparator means for comparing the relative ratio of total gas flow in said discharge line and the gas flow in said third conduit means, said second comparator providing a second output signal when said relative ratio of flow falls outside a predetermined range; and
   means responsive to said second output signal for automatically adjusting said third flow regulator.

3. A system as defined in claim 2 further comprising:
   a heat exchange means common to each of said conduit means for maintaining a substantially constant temperature.

* * * * *